United States Patent
Morrow et al.

(10) Patent No.: US 7,226,374 B2
(45) Date of Patent: Jun. 5, 2007

(54) LACROSSE HEAD AND METHOD OF FORMING SAME

(75) Inventors: David Morrow, Farmington Hills, MI (US); Jesse Hubbard, New York, NY (US); Andrew Maliszewski, Heights, MI (US); Matthew Winningham, Birmingham, MI (US)

(73) Assignee: Warrior Lacrosse, Inc., Warren, MI (US)

( * ) Notice: Subject to any disclaimer, the term of this patent is extended or adjusted under 35 U.S.C. 154(b) by 0 days.

(21) Appl. No.: 10/437,542

(22) Filed: May 14, 2003

(65) Prior Publication Data

US 2004/0072637 A1  Apr. 15, 2004

Related U.S. Application Data

(60) Provisional application No. 60/418,992, filed on Oct. 15, 2002.

(51) Int. Cl.
*A63B 59/02* (2006.01)
*A63B 65/12* (2006.01)

(52) U.S. Cl. ............... 473/513; 473/505; 473/512; D21/724

(58) Field of Classification Search ........... 473/513, 473/516, 514, 512, 505
See application file for complete search history.

(56) References Cited

U.S. PATENT DOCUMENTS

| | | | | |
|---|---|---|---|---|
| 1,555,164 A | * | 9/1925 | Schwartz | 473/544 |
| 1,611,858 A | * | 12/1926 | Middlekauff | 473/566 |
| 1,750,644 A | * | 3/1930 | Norton | 473/549 |
| 2,274,788 A | * | 3/1942 | Hatton | 473/544 |
| 3,479,030 A | * | 11/1969 | Anthony | 473/520 |
| 3,910,578 A | * | 10/1975 | Brine, Jr. | 473/513 |
| 4,129,635 A | * | 12/1978 | Yasuike et al. | 264/45.5 |
| 4,830,812 A | * | 5/1989 | Kauer | 264/572 |
| 5,028,377 A | * | 7/1991 | Hendry | 264/572 |
| 5,075,056 A | * | 12/1991 | Umlauft et al. | 264/85 |

(Continued)

FOREIGN PATENT DOCUMENTS

GB   0424742   *   2/1935

OTHER PUBLICATIONS

Webpage download, Nitrojection, Apr. 5, 2006, www.nitrojection.com, 4 pages.*

(Continued)

*Primary Examiner*—Eugene Kim
*Assistant Examiner*—M. Chambers
(74) *Attorney, Agent, or Firm*—John S. Artz; Artz & Artz, PC

(57) ABSTRACT

A lacrosse head with improved weight and handling characteristics includes a frame element having a base portion, a scoop portion, and a pair of opposing sidewall portions extending between the base portion and the scoop portion. The frame element includes one or more cavities integrally formed within one or more of the sidewall portions, the base portion, and the scoop portion. In addition, the lacrosse head includes a no-skid surface integrated with a portion of the frame element. This surface is intended to create friction between the no-skid surface and a lacrosse ball, as well as to absorb kinetic energy of the lacrosse ball preventing the ball from inadvertently bouncing out of the lacrosse head or rattling therein.

21 Claims, 5 Drawing Sheets

U.S. PATENT DOCUMENTS

| | | | |
|---|---|---|---|
| 5,118,455 A * | 6/1992 | Loren | 264/40.3 |
| 5,421,574 A * | 6/1995 | Yamagishi et al. | 473/282 |
| 5,568,925 A * | 10/1996 | Morrow et al. | 473/513 |
| 5,685,791 A * | 11/1997 | Feeney | 473/513 |
| 6,439,074 B1 * | 8/2002 | Stencel | 74/473.31 |
| 6,676,547 B1 * | 1/2004 | Morrow et al. | 473/513 |
| 6,723,134 B2 * | 4/2004 | Tucker, Sr. | 473/513 |
| 6,976,701 B2 * | 12/2005 | Gray et al. | 280/728.3 |
| 2002/0098924 A1 * | 7/2002 | Houser et al. | 473/524 |

OTHER PUBLICATIONS

Webpage download, Bayer, Apr. 5, 2006, www.bayerone.com, 6 pages.*

Webpage download, Plastics Technology, Apr. 5, 2006, www.plasticstechnology.com/articles/article_print1.cfm, 2 pages.*

* cited by examiner

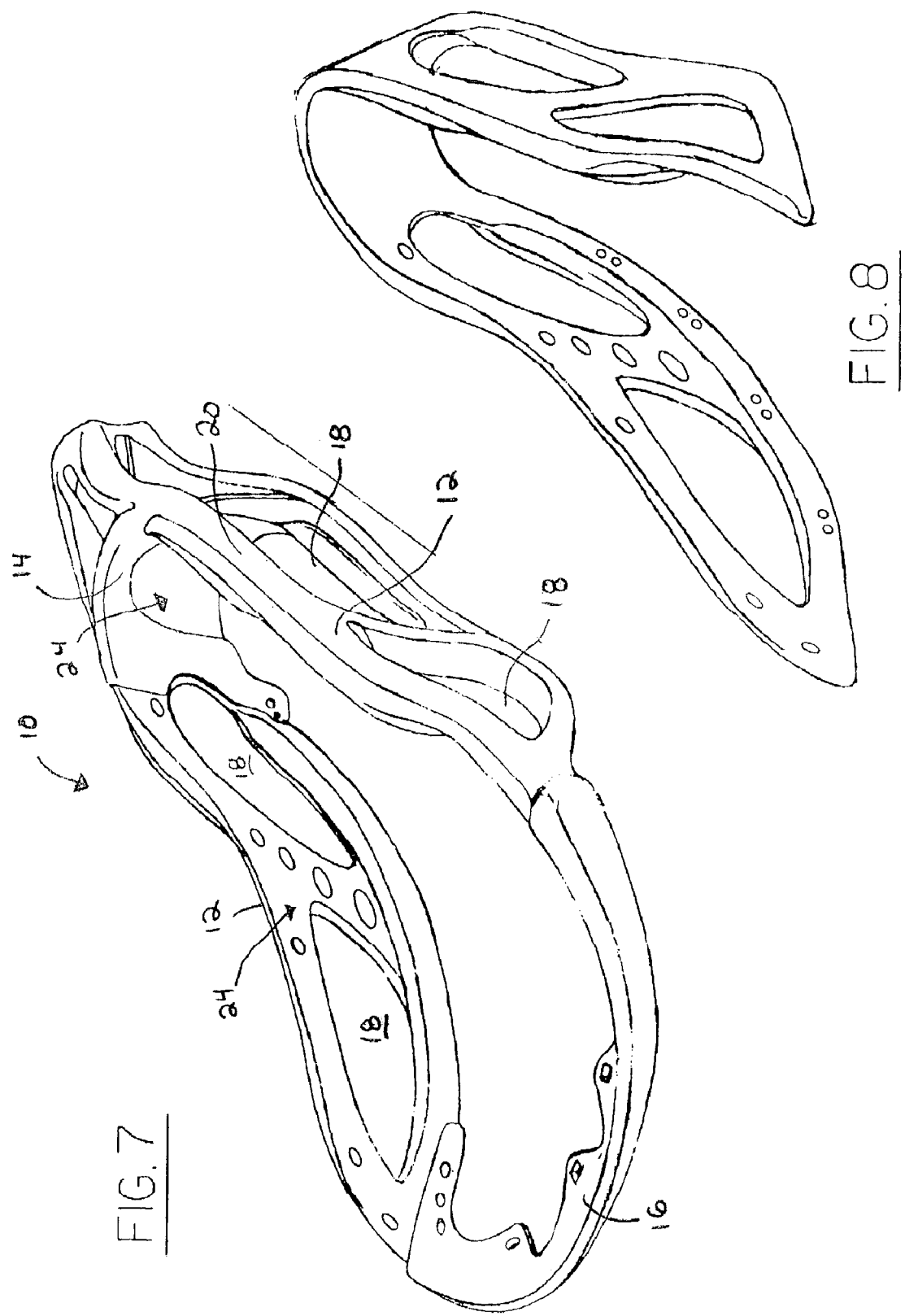

LACROSSE HEAD AND METHOD OF FORMING SAME

CROSS-REFERENCE TO RELATED APPLICATIONS

The present application claims priority to U.S. Provisional Application Serial No. 60/418,992, entitled "Lacrosse Head And Method Of Forming Same," and filed Oct. 15, 2002, and U.S. patent application Ser. No. 10/187,769, entitled "Lacrosse Head," and filed Jul. 2, 2002, the disclosures of which are incorporated by reference herein.

TECHNICAL FIELD

The present invention relates generally to lacrosse heads for attachment to lacrosse sticks, and more particularly to lacrosse heads having decreased weight, for enhancing the ball handling capabilities of the head, and decreasing the material costs of the head.

BACKGROUND

Early lacrosse stick architecture includes wooden frames having a construction consisting of a solid handle, one sidewall, and a scoop all formed as a single continuous structure. Drawbacks of these wooden frames include poor resistance to water damage, susceptibility to fractures, relatively high weight, and substantial manufacturing costs due to the labor required to manually form the lacrosse stick into the desired shape.

Subsequent developments in lacrosse head structures include employing plastic injection molding to form a single integral frame including a solid base, a solid scoop, and a pair of solid sidewalls. These plastic lacrosse heads provided increased stiffness and decreased weight as compared to the prior wooden lacrosse heads. They were also easier and less expensive to manufacture than the prior wooden sticks.

Subsequent developments involved forming these plastic lacrosse heads with openings in the sidewalls ("open sidewalls"). The lacrosse heads with open sidewalls are lighter in weight than lacrosse heads with solid walls and typically provide more flex. This decrease in weight is beneficial because it can improve the handling characteristics of these lacrosse heads and decreases the material costs and the manufacturing costs associated with the forming thereof. However, the absence of material from the sidewalls can also cause these lacrosse heads to be insufficiently stiff for resisting breakage or fracture.

To prevent premature breakage or fracture of the open sidewall lacrosse heads, reinforcing structures, such as stiffening ribs, are integrally molded into the sidewalls. These stiffening ribs are intended to provide the lacrosse head with sufficient stiffness for reinforcement and prevention of breaking or fracturing. A drawback, however, of these stiffening ribs is that they typically increase the weight of the lacrosse head. For this reason, the stiffening ribs may increase material costs as well as manufacturing costs of the lacrosse head. In view of the foregoing, a person of ordinary skill in the art would understand that the design of a lacrosse head requires a balance between the stiffness and the weight of the lacrosse head.

Recently, structures have been incorporated into lacrosse heads to provide increased dampening or absorption characteristics to facilitate catching of a lacrosse ball and to prevent the ball from bouncing out of the head either while it is being caught or while it is being cradled by a player. These structures can also provide no-skid characteristics to impart more spin to the ball as it is exiting the head, which improves passing and shooting accuracy. These structures can be integrally molded during the injection molding of the head or during an overmolding process. In any event, these structures provide additional structure to the head and thus increase the weight of the head. This is particularly true when the additional material is added to the head through subsequent processing, such as overmolding processes.

It is therefore desirable to provide a lacrosse head that is sufficiently stiff for resisting breakage, yet also has a relatively light weight for improving handling characteristics, decreasing material costs, and decreasing manufacturing costs associated therewith.

SUMMARY OF THE INVENTION

It is therefore one advantage of the present invention to provide a lacrosse head that has less weight than current lacrosse heads and which provides improved handling characteristics.

It is another advantage of the present invention to provide a lacrosse head that has less weight than current lacrosse heads and provides decreased material and manufacturing costs.

It is yet another advantage of the present invention to provide a lacrosse head that has decreased weight and increased stiffness for resisting breakage when the lacrosse head is subjected to a substantial force, such as is normally encountered during play.

It is still another advantage of the present invention to provide a lacrosse head with at least one no-skid surface for improving ball handling characteristics and that is as light and durable as present lacrosse heads.

It is yet another advantage of the present invention to provide a lacrosse head that includes at least one no-skid surface for preventing a lacrosse ball from inadvertently bouncing out of the lacrosse head or from rattling therein and that is as light and durable as present lacrosse heads.

In accordance with the above and the other advantages of the present invention, a lacrosse head with decreased weight and increased strength is provided. In one embodiment, the lacrosse head has a frame element comprised of a base portion, a scoop portion, and a pair of opposing sidewall portions extending between the base portion and the scoop portion. The frame element includes one or more cavities integrally formed within the interior of one or more of the sidewall portions, the base portion, or the scoop portion. The cavities provide a lacrosse head that is light and has increased strength and resistance to breakage. In another embodiment, the lacrosse head includes at least one no-skid surface formed thereon. This no-skid surface is intended to create friction between the head and a lacrosse ball, as well as to absorb kinetic energy of the lacrosse ball as it enters the head to prevent the ball from inadvertently bouncing out of the lacrosse head or rattling therein.

According to another embodiment of the present invention, a method of forming a lacrosse head having decreased weight and increased strength is provided. The method includes molding a lacrosse head through a gas-assist injection molding process, such that cavities or hollows are formed within the interior of the lacrosse head. The cavities can be formed in the sidewall portions, such as in the stiffening ribs. Alternatively, the cavities can be formed in the scoop portion or the base portion of the head. This process results in material savings as less plastic is used to form the head and also provides a head having increased strength. Alternatively, the cavities can be formed in the head through a structural foam molding process.

Other objects and advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIGS. 7 and 8 are perspective views of a lacrosse head, according to another embodiment of the present invention.

DESCRIPTION OF THE PREFERRED EMBODIMENT(S)

Figure 1:
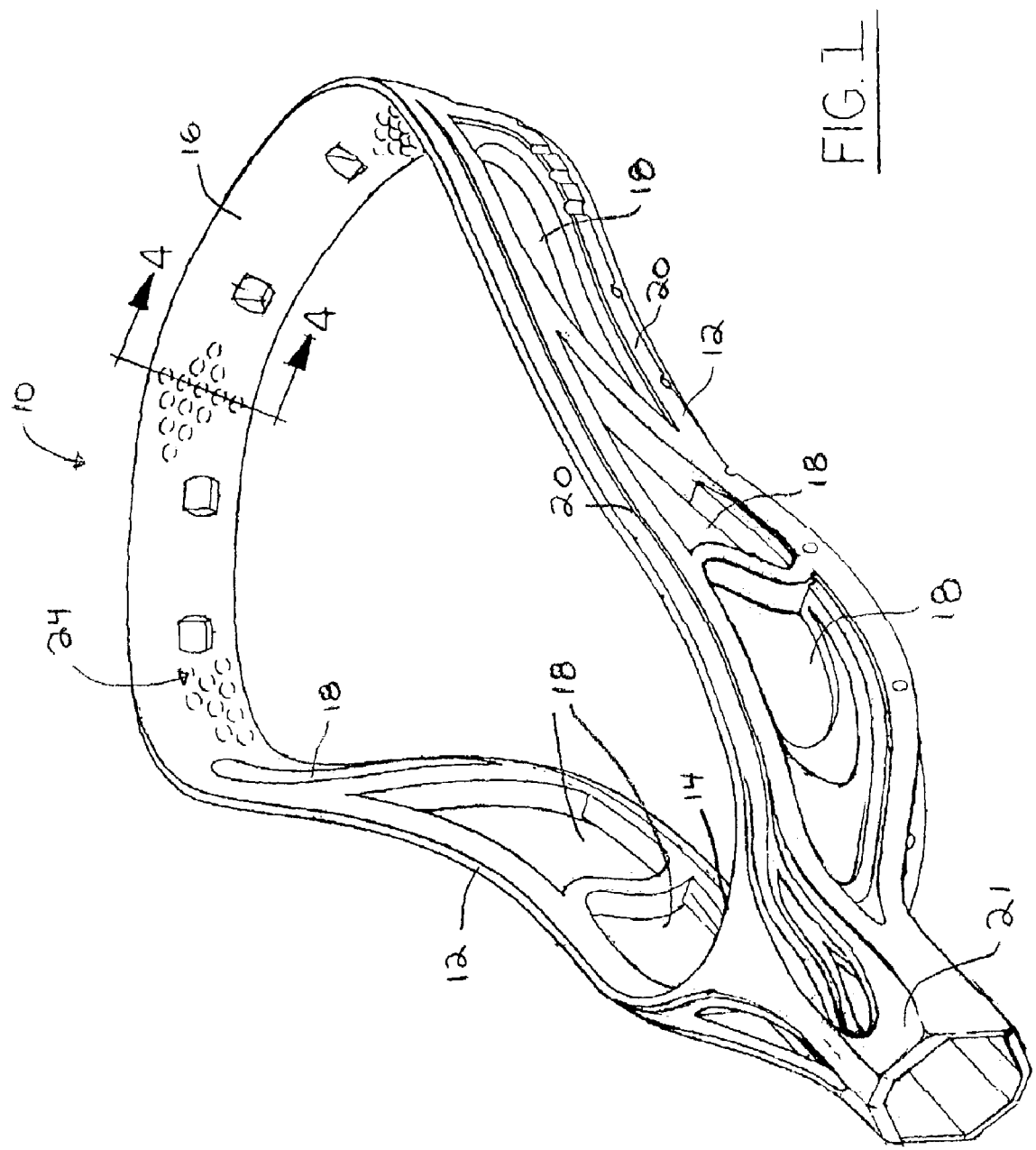
FIG. 1 is a perspective view of a lacrosse head according to a one embodiment of the present invention.
Figure 2:
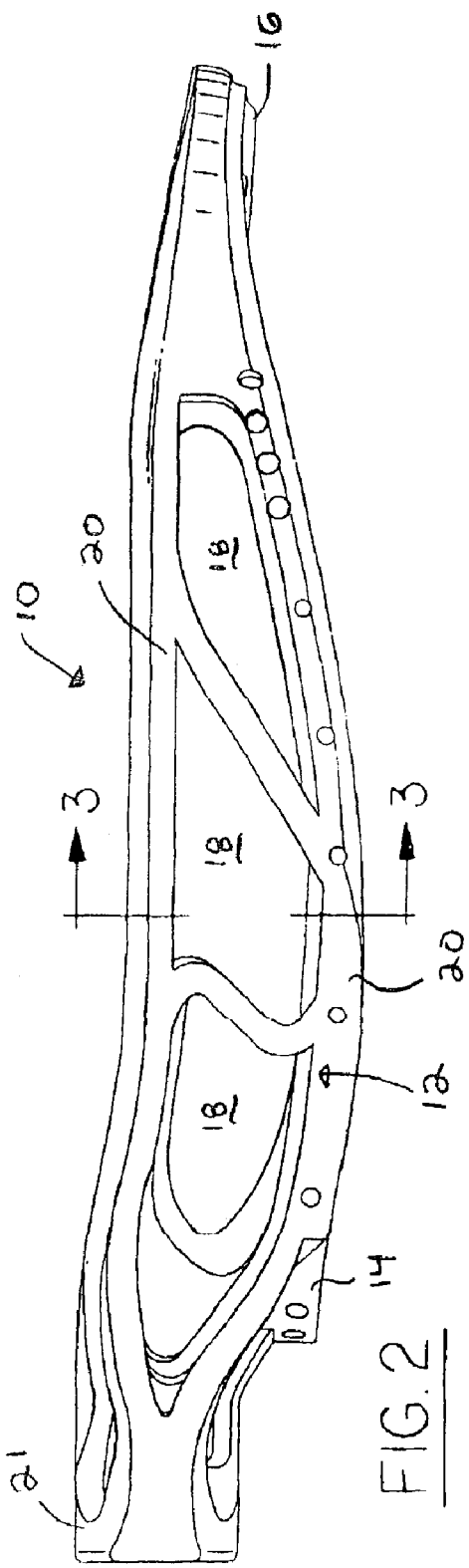
FIG. 2 is a side view of the lacrosse head shown in FIG. 1.

Referring now to FIGS. 1 and 2, there is shown a lacrosse head 10 having improved stiffness and weight characteristics according to one embodiment of the present invention. This lacrosse head 10 is a one-piece frame element including a pair of opposing sidewall portions 12 each having a top end and a bottom end, a base portion 14 extending between and connecting the bottom ends of the sidewall portions 12, and a scoop portion 16 extending between and connecting the top ends of the sidewall portions 12. The lacrosse head 10 can obviously take on a variety of different configurations.

Each of the sidewall portions 12 includes one or more sidewall openings 18 formed therethrough for decreasing the amount of material comprising the lacrosse head 10. These sidewall openings 18 are formed completely through the sidewalls 12 as is known in the art. This decrease in material is beneficial because it can likewise decrease the material costs for manufacturing each lacrosse head 10, in addition to the actual manufacturing costs associated therewith. Although FIG. 2 only illustrates three sidewall openings 18, it is understood that more or less than three sidewall openings can be utilized as desired. Additionally, the sidewall openings 18 can be sized or shaped as desired and can be formed in other portions of the lacrosse head 10 as desired. The lacrosse head 10 also includes a plurality of string holes 19 formed therein for receipt of a netting to be attached to the backside of the head 10 leaving the front side of head 10 open for receiving a lacrosse ball.

Each sidewall portion 12 also includes one or more stiffening ribs 20 for strengthening the lacrosse head 10. The stiffening ribs 20 are preferably located adjacent to the sidewall openings 18. In this regard, the stiffening ribs 20 are intended to compensate for any weakness resulting from the removal of material due to the open configuration of the sidewall portions 12. In other words, the stiffening ribs 20 reinforce their respective sidewall portions 12 adjacent to the openings 18 and improve the resistance of the lacrosse head 10 to breakage. These stiffening ribs 20 extend substantially across each sidewall portion 12 from a socket 21 to the scoop portion 16. The socket 21 extends rearwardly from the base portion 14 and is intended to receive a lacrosse stick. Although two stiffening ribs 20 are illustrated in FIGS. 1 and 2 (one above the sidewall openings 18 and one below the sidewall openings 18), it is understood that more or less than two stiffening ribs 20 can be utilized as desired. Moreover, it will also be understood that the term stiffening rib also encompasses a portion of the sidewall that has increased thickness with respect to the remaining portion of the sidewall to provide strength thereto.

Figure 3:
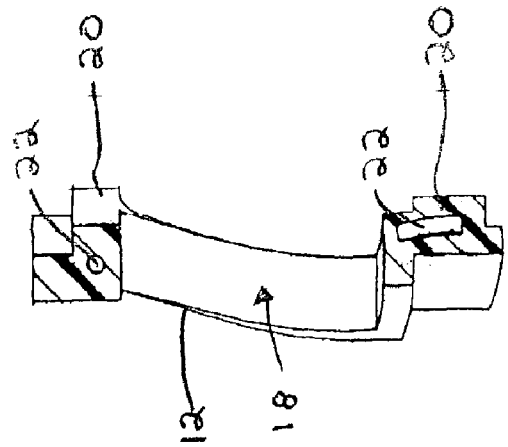
FIG. 3 is a cross-sectional view of the lacrosse head shown in FIG. 2, as taken along line 3—3.
Figure 4:
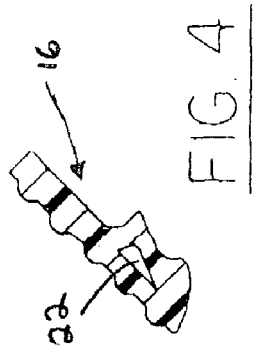
FIG. 4 is a cross-sectional view of the lacrosse head shown in FIG. 1, as taken along line 4—4.

Referring now to FIGS. 3 and 4, the lacrosse head 10 is formed of a plastic material and has one or more cavities or voids 22 formed therein for decreasing the amount of material required to form the lacrosse head 10. The cavities 22 are formed in the interior of the head 10 and are surrounded almost entirely, if not completely, by plastic. Consequently, the overall weight of the lacrosse head 10 is decreased. As is known in the art, decreasing the weight of the lacrosse head 10 can improve the handling characteristics of the lacrosse head 10 by making it easier to pass or shoot the ball. In addition, decreasing the amount of material required to form the lacrosse head 10 can decrease the material costs of the lacrosse head, as well as the manufacturing costs associated therewith.

However, a balance must be struck between lighter weight and durability. If too much weight is removed, the plastic lacrosse head 10 can be prone to undesirable flex or whip and even premature breakage Accordingly, in one embodiment, the stiffening ribs 20 each have a lengthy continuous cavity 22 formed therein by way of a gas-assisted injection molding process. The cavity 22 is not visible from the exterior of the head. This gas-assist injection molding method provides decreased weight without compromising the strength of the head. In fact, gas-assist injection molding processes typically provide even greater strength than conventional plastic injection molding because it packs the plastic out such that the outer surfaces are forced against the mold. Additionally, it is understood that the head 10 and the resultant cavities 22 can be formed by a variety of other suitable manufacturing processes, including structural foam molding processes. The location and size of the cavities 22 will depend on a variety of factors, as will be understood by one of ordinary skill in the art. Additionally, it is understood that a cavity 22 can also be formed in the base portion 14 or the scoop portion 16 or in any combination of the base portion 14, the scoop portion 16, and the sidewall portions 12 as desired.

These cavities 22 thus represent material that is omitted from the lacrosse head 10. In this regard, the cavities 22 within the lacrosse head 10 can allow the lacrosse head 10 to include the stiffening ribs 20 yet also have desired weight characteristics. For this reason, and at least in part due to the gas-assist injection molding processing, the lacrosse head 10 can be sufficiently resistant to fracturing or breaking yet also be substantially light weight.

Figure 5:
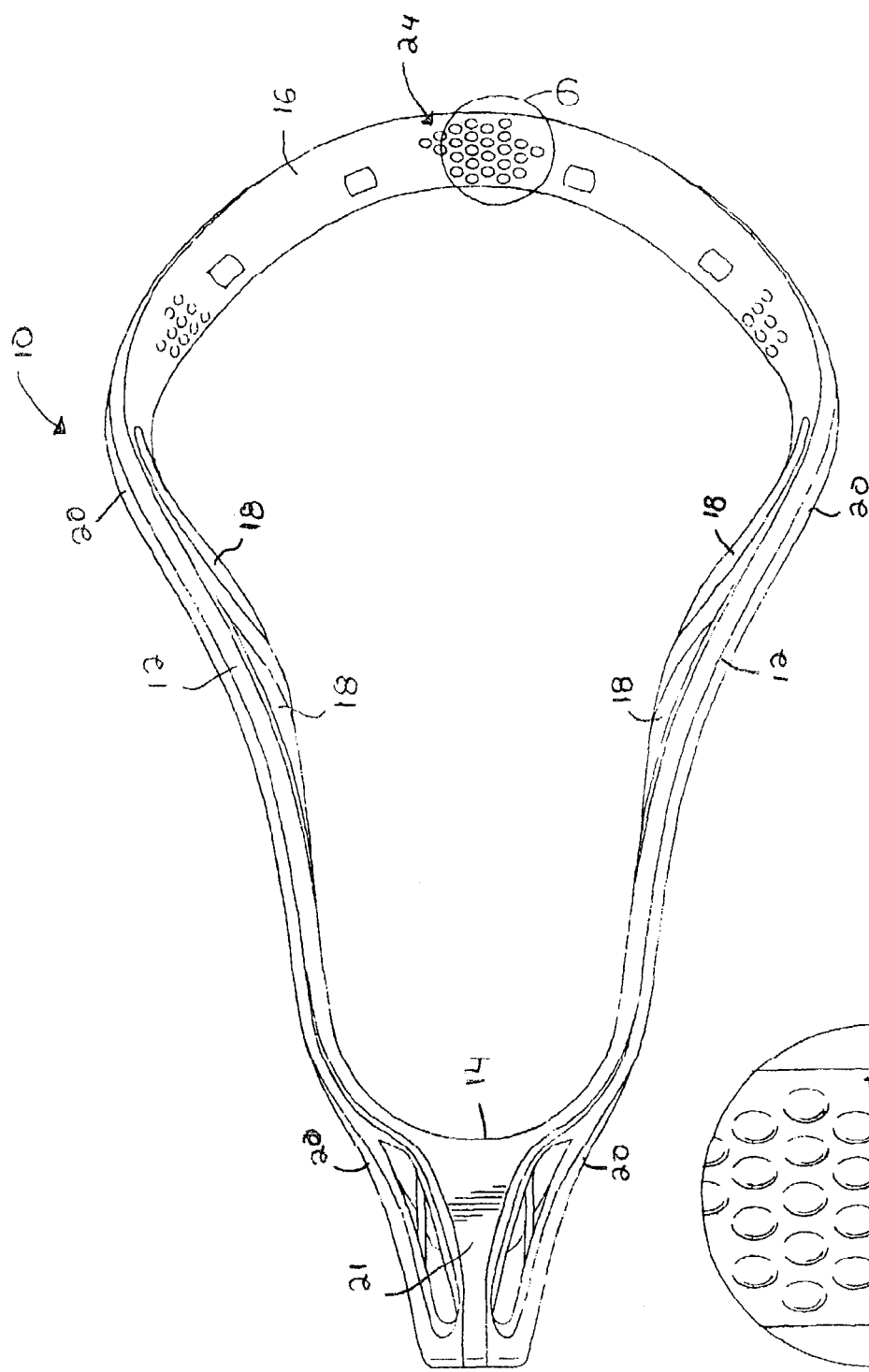
FIG. 5 is a frontal plan view of the lacrosse head shown in FIG. 1.
Figure 6:
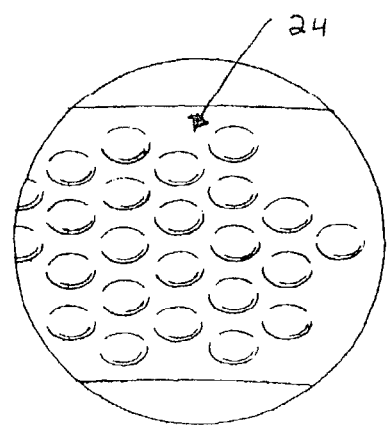
FIG. 6 is a magnified view of a scoop portion of the lacrosse head shown in FIG. 5, as taken within circle 6.
Figure 9:
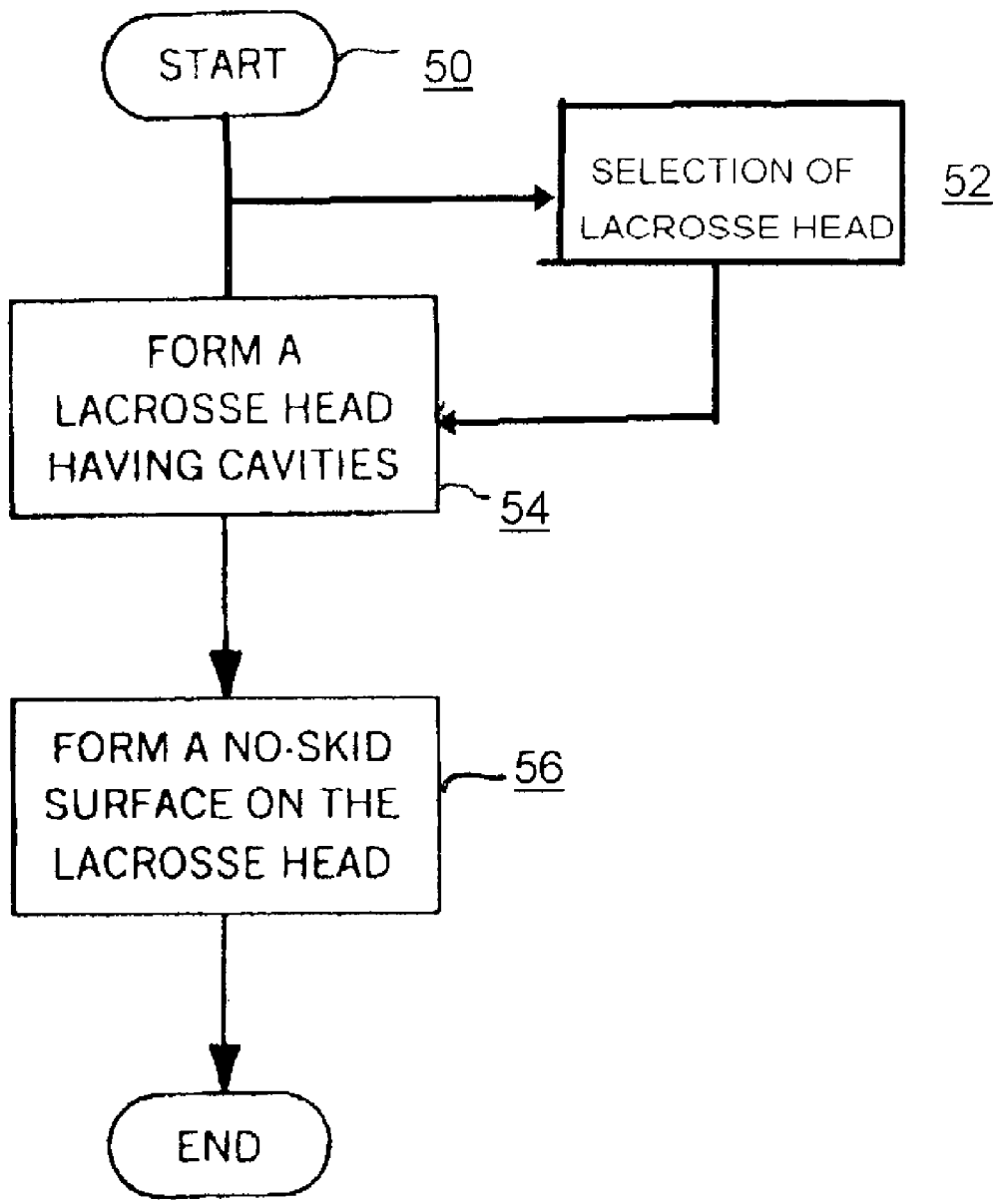
FIG. 9 is a flow chart illustrating a method for manufacturing a lacrosse head, according to one embodiment of the present invention.

Referring now to FIGS. 5 and 6, there is shown a lacrosse head 10 with a no-skid surface 24 integrated on the scoop portion 16 of the lacrosse head 10, according to another embodiment of the present invention. This no-skid surface 24 is intended to grip the lacrosse ball and prevent it from sliding across the scoop portion 16. Additionally, the no-skid surface also absorbs and cushions some force of the lacrosse ball as it enters the head. The additional weight represented by the no-skid surface 24 is offset by the omission of material resulting from the cavities 22 in the head 10. As a result, the cavities 22 allow for the lacrosse head 10 to have the no-skid surface 24 without increasing the overall weight of the lacrosse head 10. Obviously, the weight of the head 10 will depend upon the number and size of the cavities as well as the size and location of any no-skid surface.

In one embodiment, the no-skid surface 24 is comprised of a series of nubs 26 formed on the scoop portion 16. However, it is understood that various types of textured surfaces as well as other types of materials may be employed for providing friction between the lacrosse ball and the scoop portion 16. The nubs 26 preferably are integral parts of the scoop portion 16 of the lacrosse head 10, but may be otherwise as desired. For example, the no-skid surface can alternatively be created by application of a separate coating. Alternatively, the no-skid surface may be formed from the same plastic material as the frame element. It will also be understood that the no-skid surface 24 can alternatively be located anywhere on the head 10, including the base portion 14 or the sidewall portions 12. Moreover, the no-skid surface 24 may be comprised of an elastomer that is formed during an overmolding process.

The nubs 26 on the no-skid surface 24 are preferably semi-hemispherical protrusions extending outwardly from the surface of the scoop portion 16. Of course, it is understood that the nubs 26 may comprise other suitable shapes other than semi-hemispherical, such as rectangular, square, oval, or conical. Moreover, while nubs 26 are the preferred surface deformity, other surface deformities or irregularities may be utilized, including dimples. Further, the no-skid structures can be created by post manufacturing processes, such as by overmolding. These no-skid structures preferably are comprised of a deformable elastomer material, but may be comprised of various other suitable materials as desired.

These nubs 26 or other surface unevenness are interspersed across the scoop portion 16 or other portion of the head 10 to allow for increased gripping on a lacrosse ball thrown off the scoop portion 16. In other words, the no-skid structures impart friction to the lacrosse ball, which can prevent it from slipping as well as imparting spin thereto. As the player throws a lacrosse ball off the scoop portion 16, the no-skid structures grip the lacrosse ball and prevent it from sliding off the scoop portion 16 as well as prevent it from sliding laterally or side-to-side. Instead, the no-skid structures cause the lacrosse ball to roll off the scoop portion 16 with a substantial amount of spin. A person skilled in the art will understand that applying spin to the lacrosse ball produces aerodynamic conditions which enable the lacrosse ball to travel through the air with greater velocity than it would without spin. The no-skid structures also will assist a player in scooping up a lacrosse ball as opposed to pushing it across the ground because the no-skid surface provides a better grip for the lacrosse ball. This is because of the friction applied to the ball causing it to rotate into the head instead of skidding along the ground.

In addition, the no-skid structures can absorb or cushion the force of the lacrosse ball as it enters the head. This assists in preventing the ball from becoming dislodged from the head. The no-skid structures also increase a player's accuracy when a ball is thrown in from the head as they impart spin thereto. It is known in the art that lacrosse balls thrown without spin can take erratic paths, which can cause them to miss their intended target. On the other hand, lacrosse balls thrown with spin follow predictable paths and consequently allow for greater throwing accuracy by the user.

Referring now to FIG. 7, there is shown a lacrosse head 10 with a no-skid surface 24 integrated thereon, according to another embodiment of the present invention. Similar to the embodiment detailed in the description relating to FIGS. 5 and 6 above, this no-skid surface 24 is intended to create friction between the lacrosse head and the lacrosse ball. In addition, this no-skid surface 24 is also intended to absorb kinetic energy of a lacrosse ball received therein so as to prevent the lacrosse ball from inadvertently bouncing off the lacrosse head. Specifically, the no-skid structures can absorb kinetic energy of the lacrosse ball as the ball strikes the surface 24. For example, the no-skid structures can be a series of elastomer protrusions that deform when subjected to the force of an incoming lacrosse ball. The deformation of these protrusions absorbs the kinetic energy of the lacrosse ball thereby decreasing the speed and force of the ball as the ball bounces off the no-skid surface 24. In this regard, the no-skid surface 24 can prevent the lacrosse ball from inadvertently exiting the lacrosse head 10 or from rattling therein.

These no-skid surfaces can be formed by overmolding techniques. However, while their inclusion on the lacrosse head may be advantageous, it significantly increases the weight of the head. This makes a head with these features undesirable for many players. However, through the use of the gas-assist injection molding process or the structural foam molding process, the weight of the head can be reduced such that these overmolded structures will not provide a resultant head that is heavier than current lacrosse heads formed by conventional plastic injection molding techniques.

Referring now to FIG. 8, there is shown a flow diagram for manufacturing or molding a lacrosse head according to one embodiment of the present invention. The sequence starts at step 50 and immediately proceeds to step 52. In step 52, the design of the lacrosse head is selected by the manufacturer and then the configuration of the mold cavity is determined.

Thereafter, in step 54, the lacrosse head 10 is formed having one or more cavities 22 therein. As discussed above, the cavities 22 can be formed in a variety of locations and the selection of these locations will depend upon the configuration of the head. This step preferably is accomplished by utilizing a gas-assist injection molding process to form a one-piece frame element comprising the lacrosse head 10 with cavities or voids 22 formed within the interior of the plastic head. However, other suitable manufacturing processes can be utilized as desired, such as structural foam molding processes.

These cavities 22 preferably are formed within the interior of the stiffening ribs 20, the sidewall portions 12, and/or the scoop portion 16 of the lacrosse head 10. In another embodiment, the cavities 22 can also be formed in the base portion 14 or any combination of the base portion 14, the scoop portion 16, and the sidewall portions 12. As described above, the cavities 22 are beneficial for allowing the lacrosse head 10 to include a no-skid surface 24 without causing the lacrosse head 10 to have an undesired increased weight. Also, if the head 10 does not include the no-skid surface 24, the cavities 22 can substantially decrease material costs and manufacturing costs. Once the lacrosse head 10 is formed, the sequence proceeds to step 56.

In step 56, the no-skid surface or surfaces 24 are integrated onto the lacrosse head 10. As mentioned above, the no-skid surfaces 24 are intended to grip a lacrosse ball and cause it to roll across the surface 24. This surface 24 is also intended to cushion a lacrosse ball which strikes the surface 24 to absorb the kinetic energy of the ball and prevent the ball from inadvertently bouncing out of the lacrosse head 10 or rattling therein. This step preferably is accomplished by an overmolding process utilizing an elastomer material. However, as detailed above, other suitable manufacturing processes or other suitable materials can be employed as desired.

While the invention has been described in terms of preferred embodiments, it will be understood, of course, that the invention is not limited thereto since modifications may be made by those skilled in the art, particularly in light of the foregoing teachings.

What is claimed is:

1. A lacrosse head comprising:
a non-metal generally solid frame element including a ballstop portion, a scoop portion located opposite to said base portion, a throat portion extending rearwardly from said ballstop portion and intended to receive a lacrosse stick, and a pair of opposing sidewall portions extending generally between said ballstop portion and said scoop portion;
a plurality of net securing mechanisms formed in said frame element for attachment of a netting thereto for facilitating catching and holding a lacrosse ball;
the generally solid frame element having an upper portion generally defining a ball receiving portion and a lower portion generally defining a ball retention portion, said ball receiving portion being the portion of the head where a lacrosse ball enters and exits the head and said ball retention portion being the area where said netting is attached to the head;
wherein at least one of said pair of sidewall portions, said ballstop portion, or said scoop portion defines at least one substantially sized cavity integrally formed within the generally solid frame element whereby said at least one cavity is substantially hollow for reducing the weight of the lacrosse head without significantly impacting the strength or performance of the lacrosse head;
whereby said at least one substantially sized cavity is located in the generally solid frame element in a generally predetermined location.

2. The lacrosse head of claim 1, wherein said at least one cavity is formed in said scoop portion.

3. The lacrosse head of claim 1, wherein each of said pair of opposing sidewall portions includes at least one stiffening rib integrated therein with said at least one cavity being formed in each of said stiffening ribs.

4. The lacrosse head of claim 3, wherein said frame element is comprised of an injection molded plastic material.

5. The lacrosse head of claim 1, further comprising:
a plurality of no-skid structures formed on said frame element to cushion the force of a ball contacting the head.

6. A plastic lacrosse head comprising:
an open frame having an upper portion generally defining a ball receiving portion and a lower portion generally defining a ball retention portion, said ball receiving portion being the area of the head where a lacrosse ball enters and exits the head and said ball retention portion being the area of the head where a netting is attached, said open frame including;
a pair of opposing sidewall portions each having a top end and a bottom end;

a ballstop portion extending generally between said bottom ends of said pair of opposing sidewall portions; and
a scoop portion extending generally between said top ends of said pair of opposing sidewall portions;
a plurality of net securing mechanisms formed in said open frame adjacent said lower portion for receiving said netting in fixed relation with said open frame;
a plurality of elongated generally hollow cavities formed within a substantially solid interior of the plastic material forming the lacrosse head for decreasing the weight thereof without significantly impacting the strength or playability of the head.

7. The lacrosse head of claim 6, wherein each of said pair of opposing sidewall portions includes at least one stiffening rib integrated therein, with each of said at least one stiffening ribs having one of said plurality of cavities formed therein.

8. The lacrosse head of claim 6, wherein said pair of opposing sidewall portions, said ballstop portion, and said scoop portion comprise a one-piece integral frame.

9. The lacrosse head of claim 6, further comprising:
at least one no-skid surface integrated in the frame element, said at least one no-skid surface intended to create friction between said at least one no-skid surface and a lacrosse ball.

10. The lacrosse head of claim 9, wherein at least one said no-skid surface is formed on at least one of said scoop, said ballstop or said pair of opposing sidewall portions.

11. The lacrosse head of claim 9, wherein said at least one no-skid surface is comprised of a separate coating that is applied to at least one of said pair of opposing sidewall portions, said ballstop portion, or said scoop portion.

12. The lacrosse head of claim 9, wherein said at least one no-skid surface is applied to at least one of said pair of opposing sidewall portions, said ballstop portion, or said scoop portion through an overmolding process.

13. The lacrosse head of claim 9, wherein said at least one no-skid surface includes a plurality of surface structures formed thereon, said plurality of structures intended to increase friction between said no-skid surface and said lacrosse ball, said plurality of surface structures intended to absorb kinetic energy of said lacrosse ball.

14. A lacrosse head comprising:
a one-piece substantially solid plastic frame element, including a ballstop portion, a scoop portion located opposite to said ballstop portion, a throat portion extending rearwardly from said ballstop portion and intended to receive a lacrosse handle, and a pair of opposing sidewall portions extending between said ballstop portion and said scoop portion; and
said plastic frame element having an upper portion generally defining a ball receiving portion and a lower portion generally defining a ball retention portion, said ball receiving portion being the area of the head where a lacrosse ball enters and exits the head and said ball retention portion being the area of the head where a netting is attached;
a plurality of net securing mechanisms formed in said plastic frame element for attachment of said netting thereto to facilitate catching and throwing a lacrosse ball;
a plurality of generally hollow cavities formed within said one-piece substantially solid frame element at generally predetermined locations, said plurality of cavities each having a generally predetermined size and shape;

whereby the lacrosse head has decreased weight without significantly impacting strength and playability of the head.

15. The lacrosse head of claim 14, wherein at least one of said plurality of cavities is formed in said ballstop portion.

16. The lacrosse head of claim 14, wherein at least one of said plurality of cavities is formed in at least one of said pair of sidewalls.

17. The lacrosse head of claim 14, wherein at least one of said plurality of cavities is formed in said scoop portion.

18. The lacrosse head of claim 14, wherein said plurality of cavities are formed through gas assist injection molding processes.

19. The lacrosse head of claim 14 further comprising:
at least one no-skid surface disposed on said frame element.

20. A lacrosse head comprising:
a one-piece substantially solid plastic frame element, including a ballstop portion, a scoop portion located opposite to said ballstop portion, a throat portion extending rearwardly from said ballstop portion and intended to receive a lacrosse handle, and a pair of opposing sidewall portions extending generally between said ballstop portion and said scoop portion;
an attachment section coupled to said frame element for attaching a netting for receiving a lacrosse ball;
said plastic frame element having an upper portion generally defining a ball receiving portion and a lower portion generally defining a ball retention portion, said ball receiving portion being the area of the head where a lacrosse ball enters and exits the head and said ball retention portion being the area of the head where said netting is attached; and
a plurality of generally hollow cavities formed within said one-piece substantially solid frame element at generally predetermined locations within each of said scoop portion and said pair of sidewalls, said plurality of cavities each having a generally predetermined size and shape, such that a first shape of one of said plurality of cavities within said scoop portion differs from a second shape of another one of said plurality of cavities within at least one of said pair of sidewalls;
whereby the lacrosse head contains less material without substantially affecting strength and playability issues.

21. A lacrosse head comprising:
a non-tubular frame element including a ballstop portion, a scoop portion located opposite to said ballstop portion, a throat portion extending rearwardly from said ballstop portion and intended to receive a lacrosse stick, and a pair of opposing sidewall portions extending generally between said ballstop portion and said scoop portion;
said frame element having an upper portion generally defining a ball receiving portion and a lower portion generally defining a ball retention portion, said ball receiving portion being the area of the head where a lacrosse ball enters and exits the head and said ball retention portion being the area of the head where a netting is attached; and
a plurality of net securing structures formed adjacent said ball retention portion to allow said netting to be attached to the head;
wherein at least one of said pair of sidewall portions, said ballstop portion, or said scoop portion defines at least one substantially sized cavity integrally formed within a generally solid frame element thereof whereby said at least one cavity is substantially hollow for reducing the weight of the lacrosse head, whereby outer surfaces of the lacrosse head are forced against a mold during manufacture such that said at least one cavity is invisible from an exterior of the head.

* * * * *